AGUR JUDSON.
Sheet No. 1
2 Sheets.
Improvement in Mechanism for Cutting and Sewing Oval Seams.
No. 4,639.
Reissued Nov. 21, 1871.
Fig. 1.
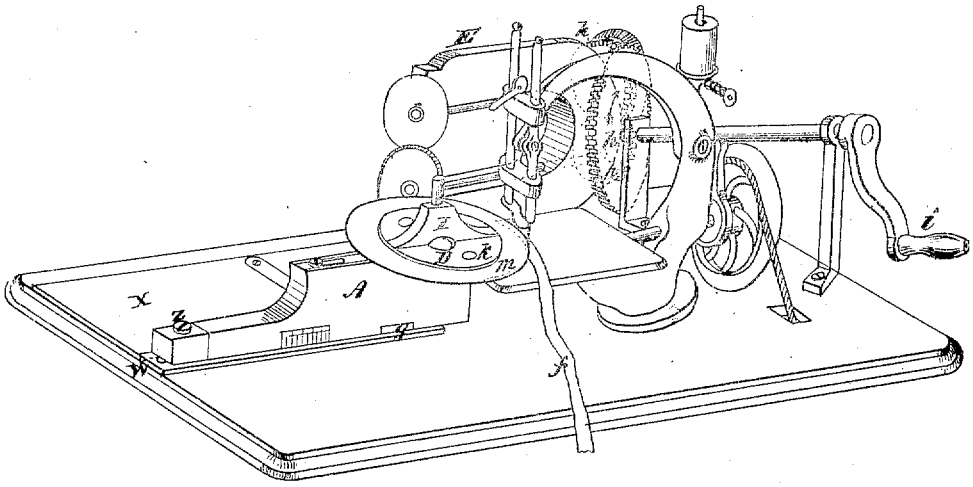
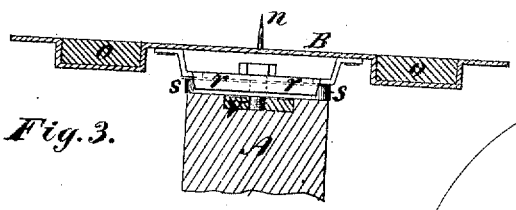
Fig. 3.
Fig. 3¹.
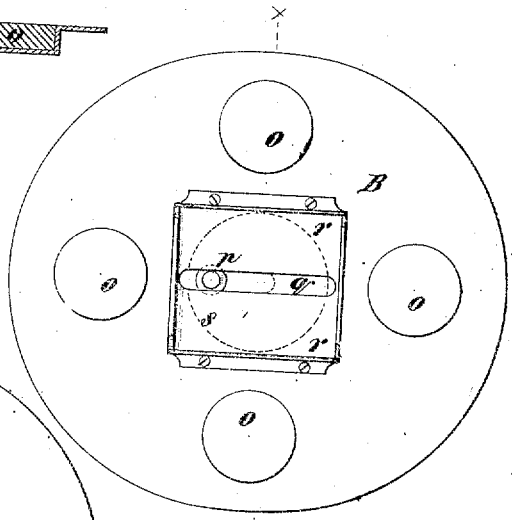
Fig. 3².
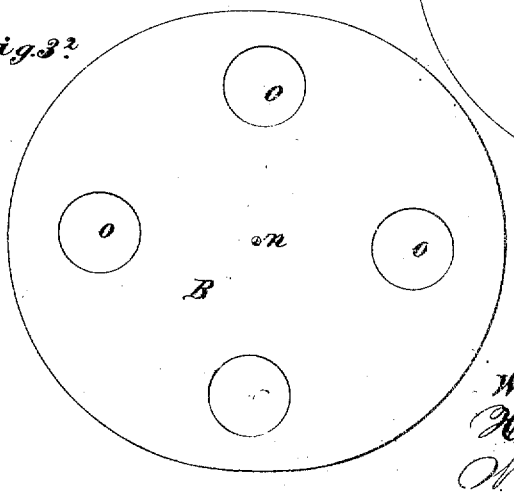
Inventor.
Agur Judson
Witnesses.
H. L. Perrine.
W. Bradford Sheet No. 2.
2 Sheets.
AGUR JUDSON.
Improvement in Mechanism for Cutting and Sewing Oval Seams.
No. 4,639.
Reissued Nov. 21, 1871.
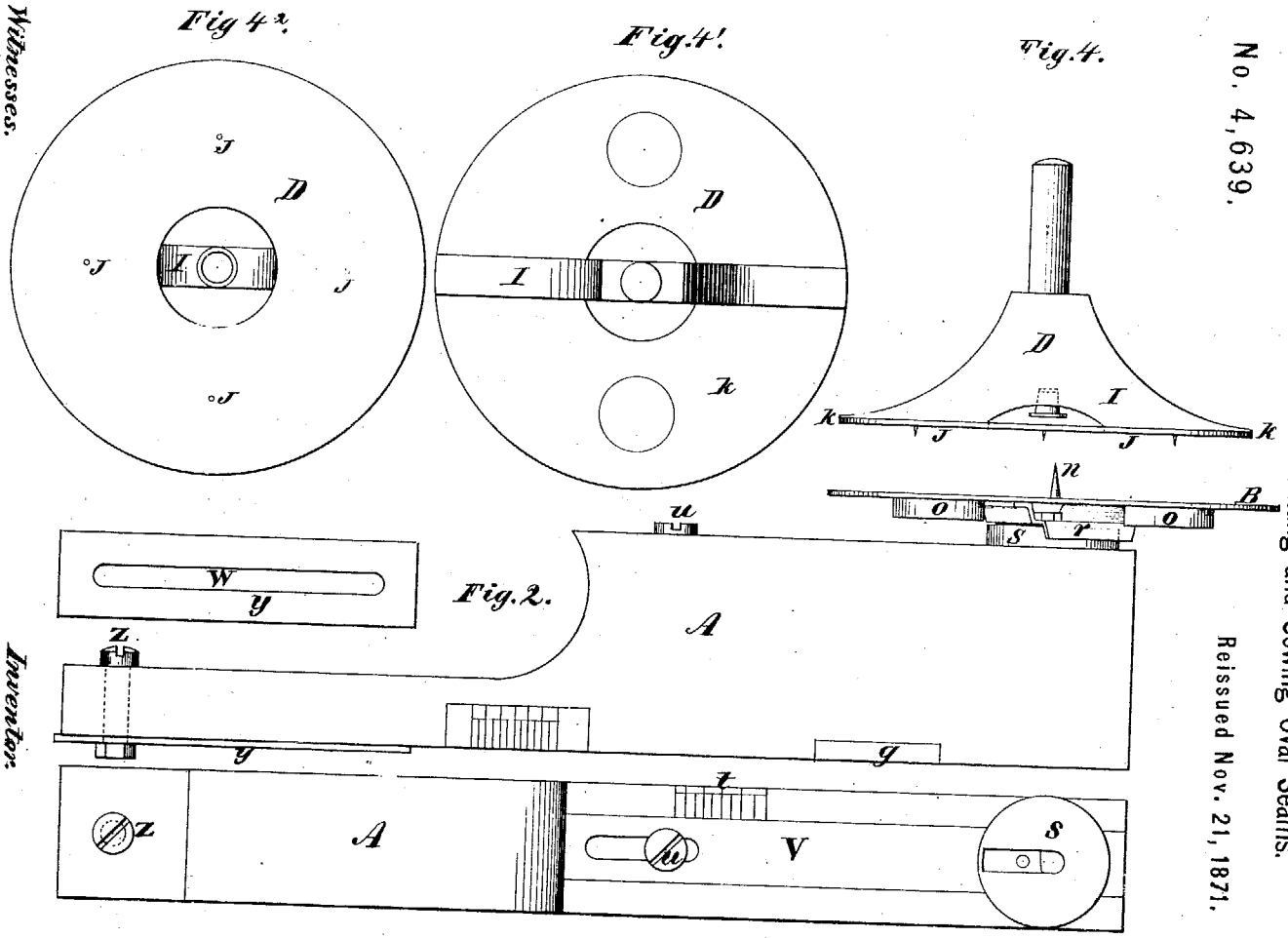
Witnesses.
H. L. Penine.
W. Bradford
Inventor.
Agur Judson.

UNITED STATES PATENT OFFICE.

AGUR JUDSON, OF NEWARK, NEW JERSEY.

IMPROVEMENT IN MECHANISMS FOR CUTTING AND SEWING OVAL SEAMS.

Specification forming part of Letters Patent No. 68,828, dated September 10, 1867; reissue No. 4,639, dated November 21, 1871.

*To all whom it may concern:*

Be it known that I, AGUR JUDSON, of the city of Newark, in the county of Essex and State of New Jersey, have invented certain Improvements in Attachments for Sewing-Machines for Cutting Ovals and for Sewing Oval Seams; and I do hereby declare the following to be a full and exact description of the same, reference being had to the drawing accompanying this specification and making part of the same.

The object of my invention is, by the aid of certain attachments to be used in connection with a sewing-machine, to cause the fabric or material to be stitched in oval, elliptic, or similar forms, which may be readily varied at will, both in size and proportions; and also in connection therewith the ready shifting and presenting of the material to the cutters to be cut in the desired oval form. While the devices may be used whenever it may be desirable to ornament or stitch together fabrics in an oval form, they are peculiarly applicable in the stitching of the tips of the linings of hats, in the uniting together by stitching of such tips with the side linings, and in the cutting of such tips in the desired oval form and size from the piece or sheet of fabric. To accomplish the above-stated objects, my invention consists in the use of a bed-piece, supporting novel adjustable devices for carrying and operating an oval plate; in novel means for affixing the fabric to this plate; in means for graduating and indicating the sizes of the oval or ellipse to be stitched, and also in means for changing its relative diameters; in the application to a sewing-machine of revolving cutters, which shall also serve to feed to themselves the material to be cut, and in combining with the same the devices for describing the proper oval.

The form in which I have embodied my invention I will now proceed to describe. I have illustrated it as applied to a sewing-machine of the general structure known as the Wilcox and Gibbs machine, a portion of the work-plate being cut away to receive properly the revolving plate which guides and sustains the cloth and permits it to be revolved; but it is evident that it may be applied equally well to most if not all the varieties of machines in use.

In the drawing, Figure 1 represents a sewing-machine with my improved mechanism for guiding the cloth for oval seams, and also with the cutters in their proper positions for operation. Fig. 2 represents a side view and also a top view of the oval moving holder in full size. Figs. 3, $3^1$, $3^2$ represent the parts which produce the oval movement, and Figs. 4, $4^1$, $4^2$ the parts of the device for holding the silk and other fabric to be sewed and cut.

The same letters refer to the same parts in each figure.

A denotes the bed-piece of the holder, which is attached to a sewing-machine table by, and vibrates, when desired, upon, the screw-bolt *z*. Either a slot is cut in the table of the sewing-machine or a plate, *y*, is inserted in the same; this plate having a longitudinal slot, *w*, through which a screw on the end of a bolt, *z*, passes to a nut beneath for the purpose of adjusting the distance from the needle and the cutters, as the work may require. A scale upon the side of A indicates this distance. Upon the top of A is a sliding plate, V, which is held in the required position by the screw *u* when the plate is adjusted to the sized oval required, this latter being indicated by the scale *t*. Upon the end of A is a circular piece of metal, *s*, in which is a slot from near its edge to a short distance past its center. This disk is screwed to the top of A, the slide V passing beneath it. It is shown in Fig. $3^1$ by dotted lines upon the under-side view of the oval plate B. A thin flat plate, *r*, is provided, with its two parallel edges turned down at right angles to the plate, and fitting snugly over the edge of the disk, but yet at liberty to turn and slide upon the same. In this plate is a slot, *q*, through which, as well as through a slot in the disk *s*, passes the screw *p* into the threaded hole in the end of the slide V under the disk *s*. It will be seen that as the screw *p* is the guide of the movements of the plate *r* as it is turned upon the disk *s*, a line more or less oval will be described by the plate as *p* is placed nearer to or further from the center of the disk *s*, which is done at pleasure by adjusting the slide V. Thus the size of the oval is determined by the position of the screw *z*, and the shape of the oval is regulated by the position of the screw *p*. The plate *r* is firmly but removably attached to the under side of the thin metal oval plate B, and the screw *p*, passing through the plate and the disk into the slide V, confines the plate to the top of the bed-piece A, leaving it to move freely on the top around the disk *s*. The character of the movements of the plate B must therefore coincide with those of plate *r*. Plate B and its top piece D, hereinafter mentioned, should be made as light as possible, consistent with the requisite degree of strength, in order to offer as little resistance as possible to the pull of the feeding device upon the fabric. Four sockets, (more or less,) *o*, are formed in this plate B, which are filled with cork, or other suitable substance, even with the upper side of B, the sockets being closed at the lower and open at their upper ends. In the center of the plate B, upon its upper side, is fixed a sharp point or pin, *n*. D is a top piece, which, for the sake of lightness, is preferably made of wood. This piece is shown in Fig. 1 in its proper position in the machine, and is also shown in full size in Figs. 4, $4^1$, and $4^2$. It consists of a cross-piece, I, and a thin disk, *k*, the cross-piece being intended as a strengthener-bar for the disk, and also to serve the purpose of a handle. In the under side of the disk *k* needle-points project downward. In sewing an oval seam the material or fabric is put upon the point *n* on the upper side of B, as nearly central as an expert can do it on the instant; the top piece D is then put upon the fabric to be stitched, its points passing through the same into the cork in the cups or sockets *o*, thus insuring the turning of the plate B, and with it the plate *r*, about and upon the disk *s*, to produce their oval path of travel as the feed-motion of the sewing-machine carries the material along. E represents a pair of circular shears or cutters supported upon a suitable frame secured to the table or platform of the sewing-machine. These cutters are to be operated at the proper period by means of the crank *i* and bevel-gears *h h h*. The position of the cutting-edges of these cutters is adjusted nearly to the same radial distance from the screw-bolt *z*, upon which the bed-piece A turns, as is the point of the needle, so that when the piece of goods needing to be cut into an oval form is put upon B and the bed-piece A is moved about upon a line extending from *z* to the cutting-point of the cutters, the turning of the crank *i* by the hand of the operator causes the shears to draw and cut the silk or other material, the oval-describing devices acting the same as in the case of the stitching to insure the cutting in the oval form desired. The bed-piece A is then brought back to the stop, and if the article is a hat-tip the side lining *f* is held by the operator or passed through any ordinary guide and sewed to the tip by the machine.

I claim—

1. The arrangement, in connection with a sewing-machine, of rotating shears adapted to cut the material presented to them in oval or elliptical form, and so that the material so cut can be afterward presented to the sewing mechanism for the purpose set forth.

2. Mechanism, substantially as described, for guiding material in oval or elliptical forms, when combined and arranged with mechanism, substantially as described, for cutting the said material and for sewing it.

3. The revolving plate *r*, constructed and operating substantially as described.

4. The radially-slotted disk *s*, applied and operating as and for the purpose set forth.

5. The combination of the plate *r* and slotted disk *s* for joint action, substantially as set forth.

6. The combination of the adjustable slide V with the disk *s*, as and for the purpose set forth.

7. The plate B, provided with sockets for the reception of cork or other substance, as and for the purpose set forth.

8. The combination of plate B, constructed as described, with the top plate or piece D, as and for the purpose set forth.

9. The combination, with frame or bed-piece A, of a scale for indicating the size of the oval to be described.

10. The combination, with such frame or bed-piece, of a scale for indicating the change in the form of the oval to be described.

AGUR JUDSON.

Witnesses:
W. BRADFORD,
H. L. PERRINE.

(134)